United States Patent [19]

Hermann

[11] 4,340,540

[45] Jul. 20, 1982

[54] PREPARATION OF BASIC TRIARYLMETHANE DYESTUFFS

[75] Inventor: Karl H. Hermann, Leverkusen, Fed. Rep. of Germany

[73] Assignee: Bayer Aktiengesellschaft, Leverkusen, Fed. Rep. of Germany

[21] Appl. No.: 163,364

[22] Filed: Jun. 26, 1980

[30] Foreign Application Priority Data

Jul. 13, 1979 [DE] Fed. Rep. of Germany ....... 2928404

[51] Int. Cl.$^3$ .................... C07D 209/04; C09B 11/10
[52] U.S. Cl. .................... 548/440; 260/391;
260/393; 546/152; 546/196; 544/165; 544/358;
544/361; 544/372; 548/441; 548/455; 548/467;
548/469; 548/510; 548/524; 548/577
[58] Field of Search ............... 260/391, 392, 388, 390,
260/393, 386, 326.14, 326.12, 326.15, 319.1,
165, 315; 546/152, 196; 544/165, 358, 361, 372

[56] References Cited

U.S. PATENT DOCUMENTS

| | | | |
|---|---|---|---|
| 2,121,928 | 6/1938 | Basel | 260/393 |
| 3,828,071 | 8/1974 | Kast et al. | 546/152 |
| 4,211,436 | 7/1980 | Kuhlthau et al. | 260/391 |
| 4,211,716 | 7/1980 | Hermann et al. | 260/391 |

Primary Examiner—Thomas A. Waltz
Assistant Examiner—Raymond Covington
Attorney, Agent, or Firm—Sprung, Horn, Kramer & Woods

[57] ABSTRACT

To prepare basic dyestuffs of the general formula

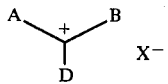

in which
A and B independently of one another represent a hetero-aromatic radical or a radical of the general formula

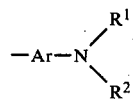

compounds of the general formula

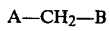

A and B have the abovementioned meaning,
are oxidized with oxygen in the presence of a nucleophilic compound of the general formula

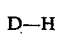

and in the presence of catalytic amounts of benzoquinones substituted by halogen or cyano or of phenanthrenequinones substituted by nitro, and in the presence of catalytic amounts of nitrogen oxides—with the exception of dinitrogen monoxide—or of substances which produce such nitrogen oxides under the reaction conditions.

3 Claims, No Drawings

PREPARATION OF BASIC TRIARYLMETHANE DYESTUFFS

The invention relates to a process for the preparation of basic dyestuffs of the general formula $$\underset{D}{\overset{A\diagdown \underset{+}{\phantom{C}} \diagup B}{C}} \quad X^- \qquad \qquad I$$

in which
A and B independently of one another represent a hetero-aromatic radical or a radical of the general formula $$Ar-N\diagup\overset{R^1}{\diagdown R^2} \qquad \qquad II$$

in which
Ar denotes the grouping

[phenyl or naphthyl structures with $(Y)_n$ substituents]

in which
Y represents hydrogen or non-ionic substituents and n represents a number from 1 to 4, and
$R^1$ and $R^2$ represent hydrogen or alkyl, aryl or aralkyl, optionally substituted by non-ionic or acid groups, or
$R^1$ and $R^2$, together or with the ortho-position of Ar, form a heterocyclic ring, and
$X^-$ represents an anion and
D denotes a hetero-aromatic radical or a radical of the formula

[structures III, IV with $(Y)_n$, $R^1$, $R^2$ substituents]

$$\underset{(Y)_n}{\overset{R^1\quad R^1}{\text{--}N-G-N-}}\underset{(Y)_n}{\overset{}{\text{--}}}\overset{+\diagup A}{\underset{\diagdown B}{C}} \quad X^- \qquad V$$

in which
A, B, Y, n, $R^1$, $R^2$ and $X^-$ have the above-mentioned meaning and
G represents a bridge member of the formula $-(CH_2)_{n1}-, -CH_2-Ar-CH_2-,$ $$-C_2H_4-\overset{R^1}{\underset{R^2}{\overset{+}{N}}}-(CH_2)_{n1}-\overset{R^1}{\underset{R^2}{\overset{+}{N}}}-C_2H_4-,$$

$$-C_2H_4-\overset{R^1}{\underset{R^2}{\overset{+}{N}}}-CH_2-Ar-CH_2-\overset{R^1}{\underset{R^2}{\overset{+}{N}}}-C_2H_4-,$$

$$-C_2H_4-\overset{R^1}{\underset{R^2}{\overset{+}{N}}}-C_2H_4- \quad \text{or}$$

$$-C_2H_4-O-\overset{O}{\overset{\|}{C}}-NH-Ar-NH-\overset{O}{\overset{\|}{C}}-O-C_2H_4-$$

in which
Ar denotes aryl and
$n^1$ denotes 2, 3 or 4, or
G, together with the two adjacent groupings $N-R^1$, forms a heterocyclic ring of the formula $$-N\diagup\overset{CH_2-CH_2}{\diagdown CH_2-CH_2}\diagdown N-$$

characterised in that compounds of the general formula $$A-CH_2-B \qquad \qquad VI$$

in which
A and B have the abovementioned meaning, are oxidised with oxygen in the presence of a nucleophilic compound of the general formula $$D-H \qquad \qquad VII$$

in which
D denotes a hetero-aromatic radical or a radical of the formula III, IV or $$\underset{}{\overset{R^1\quad R^1}{\text{--}N-G-N-}}\qquad \qquad VIII$$

and in the presence of catalytic amounts of benzoquinones substituted by halogen or cyano or of phenanthrenequinones substituted by nitro, and in the presence of catalytic amounts of nitrogen oxides—with the exception of dinitrogen monoxide—or of substances which produce such nitrogen oxides under the reaction conditions.

Alkyl radicals in the formulae are to be understood as, in particular, $C_1$- to $C_4$-alkyl radicals. The alkyl radicals carry, for example, 1 to 3 non-ionic or acid substituents. Such substituents which may be mentioned are halogen, hydroxyl, $C_1$- to $C_4$-alkyl, cyano, $C_1$- to $C_4$-alkoxy, $C_1$- to $C_4$-alkoxycarbonyl, $C_1$- to $C_3$-alkylcarbonyloxy, aminocarbonyl, sulpho or carboxyl.

Halogen is to be understood, preferably, as fluorine, chlorine or bromine.

Suitable aryl radicals are, in particular, optionally substituted phenyl and naphthyl radicals.

Suitable aralkyl radicals are, in particular, optionally substituted benzyl, α- or β-phenylethyl and α-, β- or γ-phenylpropyl radicals.

These homocyclic radicals can carry, for example, 1 to 3 substituents such as halogen, $C_1$- to $C_4$-alkyl, $C_1$- to $C_4$-alkoxy, sulpho or carboxyl.

The radicals $R^1$ and $R^2$, together or with the ortho-position of Ar, form, for example, 5-membered or 6-membered rings; together, they form, for example, a piperidine, pyrrolidine, morpholine or piperazine ring, and together with the ortho-position of Ar, they form, for example, a tetrahydroquinoline, indoline, julolidine, phenmorpholine, tetrahydroquinoxaline or carbazole ring.

Hetero-aromatic rings D which may be mentioned are, above all, the indol-3-yl, pyrazol-4-yl and pyrazolin-5-on-4-yl ring. The heterocyclic rings are substituted, for example, by $C_1$- to $C_4$-alkyl groups or phenyl.

Amongst the dyestuffs described above, those of the general formula

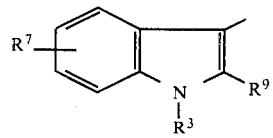

in which, independently of one another, $R^3$ and $R^5$ denote hydrogen, $C_1$- to $C_4$-alkyl, hydroxyalkyl with two or three C atoms, cyanoethyl, alkoxyalkyl with a total of three to five C atoms, alkoxycarbonylalkyl with a total of three to eight C atoms, alkylcarbonyloxyalkyl with a total of three to eight C atoms, $C_1$- to $C_4$-halogenoalkyl, sulphoalkyl with two to four C atoms, cyclohexyl, benzyl, phenyl, phenethyl, phenyl which is substituted by halogen or $C_1$- to $C_4$-alkyl or -alkoxy, or sulphobenzyl and $R^4$ and $R^6$ denote $C_1$- to $C_4$-alkyl, hydroxyalkyl with two or three C atoms, cyanoethyl, $C_1$- to $C_4$-halogenoalkyl, alkoxyalkyl with a total of three to five C atoms, alkoxycarbonylalkyl with a total of three to eight C atoms, alkylcarbonyloxyalkyl with a total of three to eight C atoms or benzyl, or $R^3$ and $R^4$ and/or $R^5$ and $R^6$ together form a pyrrolidine, piperidine, morpholine or piperazine ring which is optionally substituted by $C_1$- to $C_4$-alkyl, or $R^3$, $R^4$, $R^5$ and/or $R^6$, together with the orthoposition of the phenyl ring, form a tetrahydroquinoline, indoline, julolidine, phenmorpholine, tetrahydroquinoxaline or carbazole ring which is optionally substituted by $C_1$- to $C_4$-alkyl, phenyl or benzyl, $R^7$ and $R^8$ represent hydrogen, $C_1$- to $C_4$-alkyl, $C_1$- to $C_4$-alkoxy, carboxyl or halogen, n denotes an integer between 1 and 4 and E represents a heterocyclic radical of the general formula

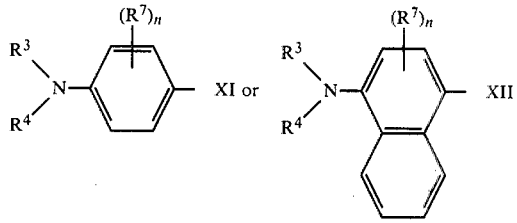

in which $R^9$ represents H, $C_1$- to $C_4$-alkyl, phenyl, carboxylic acid $C_1$- or $C_2$-alkyl ester, carboxylic acid amide which is optionally N-substituted by $C_1$- to $C_4$-alkyl, or $C_1$- to $C_4$-alkoxy or a radical of the general formula in which n, $R^3$, $R^4$ and $R^7$ have the abovementioned meaning, can be prepared particularly easily.

Particularly preferred dyestuffs are those of the general formula IX
in which, independently of one another, $R^3$ and $R^5$ represent hydrogen, methyl, ethyl, hydroxyethyl, propyl or butyl, $R^4$ and $R^6$ represent methyl, ethyl, sulphobenzyl or sulphoethyl, $R^7$ and $R^8$ represent hydrogen, methyl, methoxy or chlorine and E represents the radical of the general formula XI in which $R^3$ and $R^4$ represent methyl, ethyl or hydroxyethyl and $R^7$ represents hydrogen, methyl, carboxyl or chlorine, or E represents the radical of the general formula X in which $R^9$ represents hydrogen, methyl or phenyl and $R^3$ represents methyl, ethyl, hydroxyethyl, propyl or butyl.

The anions are derived from inorganic or organic acids and are in general determined by the preparation process and any purification of the crude dyestuff which may be carried out. In general, the dyestuffs are in the form of zinc chloride double salts, acetates, methosulphates, ethosulphates or halides (in particular as chlorides or bromides). The anions can be replaced by other anions in a known manner.

The quinones employed as oxidising agents can be: tetrachloro-, tetrabromo-, tetrafluoro- or dicyanodichloro-1,4-benzoquinone, tetrachloro- or tetrabromo-1,2-benzoquinone and 2-nitro-, 2,7-dinitro- or 4,5-dinitro-phenanthrenequinone. Tetrachloro- or tetrabromo-1,4-benzoquinone is preferred. The quinones are employed in an amount of $10^{-3}$ to $10^{-1}$ mols, relative to the molar amount of the compound VI. Instead of the quinones, it is also possible to use the corresponding hydroquinones.

Suitable catalysts are: nitrogen oxide or nitrogen dioxide, or substances which release nitrogen oxides under the reaction conditions—above all in acid solvents—for example iron-III nitrate or sodium nitrite. The catalysts are used in concentrations of 1 to 20 mol percent, relative to the substrate.

The new process is carried out by a procedure in which compounds of the general formula VI and compounds of the general formula VII are dissolved or suspended in a neutral or acid, aqueous or organic solvent at temperatures between 0° C. and 150° C., preferably between 20° and 70° C., $10^{-3}$ to $10^{-1}$ mols of quinone, relative to the molar amount of the compound VI, is added, the reaction solution is mixed intensively with oxygen, usually pure oxygen or air, which is fed in and, in the course of the reaction, either 1 to 20 mol percent of nitrates or nitrites are added or a total of 1 to 20 mol percent of nitrogen oxides is metered in. The nitrogen oxides can be metered in either with the stream of oxygen or from a separate metering device. Intensive thorough mixing of the gas and liquid is necessary in order to achieve a high rate of reaction. It is also possible to carry out the reaction under pressure.

A procedure can also be followed in which the compounds of the general formula VII are not already added at the start of the oxidation reaction but only in the course thereof. It is also possible not to use the compounds of the general formula VI as such but to form them under the reaction conditions according to the invention, by using the relevant starting materials (formaldehyde and dialkylaniline).

Examples of suitable solvents for the oxidation are: methylene chloride, chloroform, carbon tetrachloride, chlorobenzene, dichlorobenzene, benzene, toluene, xylene, cumene, acetic acid, propionic acid, lactic acid, dichloroethane, methanol, ethanol, propanol, isopropanol, butanol, glycol, methylglycol, dimethylglycol, tetrahydrofurane, dioxane, ethyl acetate, dimethylformamide, N-methylpyrrolidone, acetone or mixtures thereof. The reaction can also be carried out in aqueous solution or suspension or in a mixture of water and water-miscible solvents. The pH value of the reaction solution should be in the neutral to acid range, depending on the dyestuff. The acid pH range between pH 1 and pH 4 is preferred. The following examples illustrate the invention.

EXAMPLE 1

76.2 g of 4,4'-bis-(dimethylamino)-diphenylmethane, 36.3 g of dimethylaniline, 6 g of chloranil and 600 g of glacial acetic acid are treated intensively with air at 40° C. In the course of the reaction, which lasts about 24 hours, a total of 1.2 g of a mixture of nitrogen monoxide and nitrogen dioxide, produced by treating sodium nitrite with sulphuric acid, is uniformly metered into the mixture. When the reaction has ended, the reaction solution contains crystal violet in 87% yield. After distilling off the glacial acetic acid, the residue is dissolved in 500 g of water at 80° C. After filtering the solution, the dyestuff is precipitated by adding sodium chloride. Yield: 101 g.

Similarly good results are obtained if instead of the nitrogen oxides, 2.5 g of sodium nitrite of 2.5 g or iron-III nitrate are uniformly added during the atmospheric oxidation.

EXAMPLE 2

93 g of 4,4'-bis-(diethylamino)-diphenylmethane, 36.3 g of dimethylaniline, 6 g of chloranil and 600 g of glacial acetic acid are subjected to intensive gassing with air at 40° C. A total of 1.2 g of a mixture of nitrogen monoxide and nitrogen dioxide, produced by treating sodium nitrite with sulphuric acid, is uniformly metered into the mixture in the course of the reaction. When the reaction has ended, the reaction solution contains the dyestuff of the formula

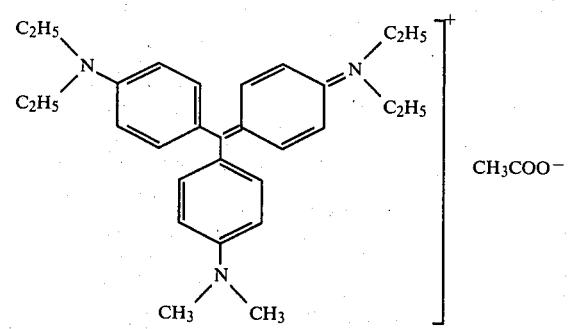

in 82% yield.

The following diphenylmethanes and compounds of the general formula VII can be oxidised to give triarylmethane dyestuffs by the process according to the invention:

| Example | Diphenylmethane | Compound of the formula VII |
|---|---|---|
| 3 | 4,4'-Bis-(dimethylamino)-diphenylmethane | ⌬—N(C₂H₅)₂ |
| 4 | 4,4'-Bis-(dimethylamino)-diphenylmethane | (3-CH₃-C₆H₄)—N(CH₃)₂ |
| 5 | 4,4'-Bis-(dimethylamino)-diphenylmethane | (3-COOH-C₆H₄)—N(CH₃)₂ |
| 6 | 4,4'-Bis-(dimethylamino)-diphenylmethane | (3-NHCOCH₃-C₆H₄)—N(CH₃)₂ |
| 7 | 4,4'-Bis-(dimethylamino)-diphenylmethane | ⌬—N(C₂H₄OH)₂ |
| 8 | 4,4'-Bis-(dimethylamino)-diphenylmethane | (3-CH₃-C₆H₄)—N(C₂H₄OH)₂ |
| 9 | 4,4'-Bis-(dimethylamino)-diphenylmethane | ⌬—N(CH₃)(C₂H₄CN) |
| 10 | 4,4'-Bis-(dimethylamino)-diphenylmethane | ⌬—N(CH₃)—⌬ |

| Example | Diphenylmethane | Compound of the formula VII |
|---|---|---|
| 11 | 4,4'-Bis-(dimethyl-amino)-diphenylmethane | Ph-N(CH₃)-CH₂-Ph |
| 12 | 4,4'-Bis-(dimethyl-amino)-diphenylmethane | (tetrahydroquinoline with H₃C, H, H, H, CH₃, CH₃, N-CH₃ substituents) |
| 13 | 4,4'-Bis-(dimethyl-amino)-diphenylmethane | Ph-N(CH₂CH₂)₂O (morpholine) |
| 14 | 4,4'-Bis-(dimethyl-amino)-diphenylmethane | naphthyl-N(CH₃)-Ph |
| 15 | 4,4'-Bis-(dimethyl-amino)-diphenylmethane | 2-phenylindole (N-H) |
| 16 | 4,4'-Bis-(dimethyl-amino)-diphenylmethane | 2-phenyl-N-methylindole |
| 17 | 4,4'-Bis-(dimethyl-amino)-diphenylmethane | 2-methylindole (N-H) |
| 18 | 4,4'-Bis-(diethyl-amino)-diphenylmethane | Ph-N(C₂H₅)₂ |
| 19 | 4,4'-Bis-(diethyl-amino)-diphenylmethane | 3-methyl-Ph-N(CH₃)₂ |
| 20 | 4,4'-Bis-(diethyl-amino)-diphenylmethane | 3-chloro-Ph-N(CH₃)₂ |
| 21 | 4,4'-Bis-(diethyl-amino)-diphenylmethane | 2-phenyl-N-methylindole |
| 22 | 4,4'-Bis-(cyano-ethylethylamino)-diphenylmethane | Ph-N(CH₃)₂ |
| 23 | 4,4'-Bis-(cyano-ethylethylamino)-diphenylmethane | Ph-N(C₂H₅)₂ |
| 24 | 4,4'-Bis-(cyano-ethylethylamino)-diphenylmethane | 3-methyl-Ph-N(CH₃)₂ |
| 25 | 4,4'-Bis-(dimethyl-amino)-2,2'-dimethyl-diphenylmethane | Ph-N(CH₃)₂ |
| 26 | 4,4'-Bis-(dimethyl-amino)-2,2'-dimethyl-diphenylmethane | Ph-N(C₂H₅)₂ |
| 27 | 4,4'-Bis-(dimethyl-amino)-2,2'-dimethyl-diphenylmethane | Ph-N(C₂H₄OH)₂ |

EXAMPLE 28

A mixture of 108.9 g of dimethylaniline, 12 g of paraformaldehyde, 600 g of glacial acetic acid and 6 g of chloranil is warmed to 60° C. for 2 hours. Thereafter, the reaction mixture is cooled to 40° C. and then subjected to intensive gassing with air. A total of 1.2 g of a mixture of nitrogen monoxide and nitrogen dioxide is uniformly metered into the mixture in the course of the reaction. When the reaction has ended, the mixture is worked up as described in Example 1. 95 g of crystal violet are obtained.

I claim:

1. In the preparation of a basic dyestuff of the formula

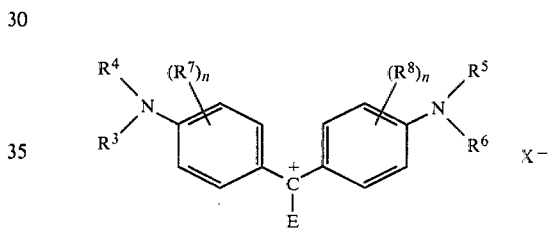

in which
$R^3$ and $R^5$ each independently is hydrogen, $C_1$- to $C_4$-alkyl, hydroxyalkyl with two or three C atoms, cyanoethyl, alkoxyalkyl with a total of three to five C atoms, alkoxycarbonylalkyl with a total of three to eight C atoms, alkylcarbonyloxyalkyl with a total of three to eight C atoms, $C_1$- to $C_4$-halogenoalkyl, sulphoalkyl with two to four C atoms, cyclohexyl, benzyl, phenyl, phenethyl, phenyl which is substituted by halogen or $C_1$- to $C_4$-alkyl or -alkoxy, or sulphobenzyl, $R^4$ and $R^6$ each independently is $C_1$- to $C_4$-alkyl, hydroxyalkyl with two or three C atoms, cyanoethyl, $C_1$- to $C_4$-halogenoalkyl, alkoxyalkyl with a total of three to five C atoms, alkoxycarbonylalkyl with a total of three to eight C atoms, alkylcarbonyloxyalkyl with a total of three to eight C atoms or benzyl, or $R^3$ and $R^4$ and/or $R^5$ and $R^6$ together form a pyrrolidine, morpholine or piperazine ring which is optionally substituted by $C_1$- to $C_4$-alkyl, or $R^3$, $R^4$, $R^5$ and/or $R^6$, together with the ortho position of the phenyl ring, form a tetrahydroquinoline, indoline, tulolidine, phenmorpholine, tetrahydroquinoxaline or carbazole ring which is optionally substituted by $C_1$- to $C_4$-alkyl, phenyl or benzyl, $R^7$ and $R^8$ each independently is hydrogen, $C_1$- to $C_4$-alkyl, $C_1$- to $C_4$-alkoxy, carboxyl or halogen, n denotes an integer between 1 and 4,

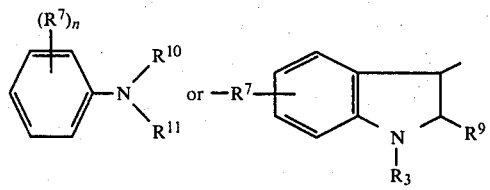

$R^9$ is H, $C_1$- to $C_4$-alkyl, phenyl, carboxylic acid $C_1$- or $C_2$-alkyl ester, carboxylic acid amide which is optionally N-substituted by $C_1$- to $C_4$-alkyl, or $C_1$- to $C_4$-alkoxy or a radical of the formula

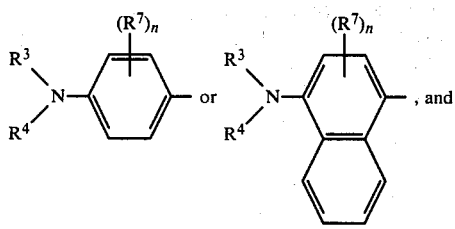

$R^{10}$ and $R^{11}$ each independently is methyl, ethyl or hydroxyethyl, the steps comprising oxidizing a compound of the formula

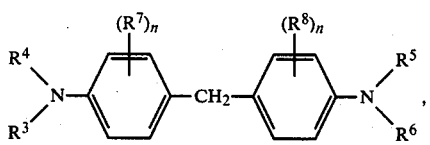

in the presence of a nucleophilic compound of the formula

in the presence of quinone oxidizing agent with a catalyst comprising nitrogen oxide or compound forming it selected from the group consisting of nitrogen monoxide, nitrogen dioxide, sodium nitrite or iron-III nitrate.

2. A process according to claim 1, wherein the compound being oxidized is of the formula

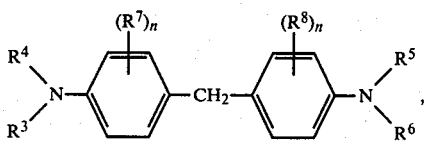

the nucleophilic compound is of the formula

the nitrogen oxide or compound forming it is nitrogen monoxide, nitrogen dioxide, sodium nitrite or iron-III nitrate, and the end product is of the formula

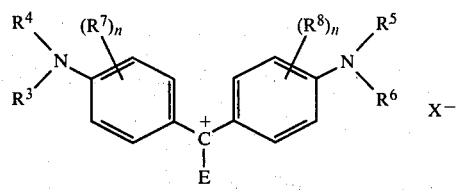

in which $R^3$ and $R^5$ each independently is hydrogen, $C_1$- to $C_4$-alkyl, hydroxyalkyl with two or three C atoms, cyanoethyl, alkoxyalkyl with a total of three to five C atoms, alkoxycarbonylalkyl with a total of three to eight C atoms, alkylcarbonyloxyalkyl with a total of three to eight C atoms, $C_1$- to $C_4$-halogenoalkyl, sulphoalkyl with two to four C atoms, cyclohexyl, benzyl, phenyl, phenethyl, phenyl which is substituted by halogen or $C_1$- to $C_4$-alkyl or -alkoxy, or sulphobenzyl, $R^4$ and $R^6$ each independently is $C_1$- to $C_4$-alkyl, hydroxyalkyl with two or three C atoms, cyanoethyl, $C_1$- to $C_4$-halogenoalkyl, alkoxyalkyl with a total of three to five C atoms, alkoxycarbonylalkyl with a total of three to eight C atoms, alkylcarbonyloxyalkyl with a total of three to eight C atoms or benzyl, or $R^3$ and $R^4$ and/or $R^5$ and $R^6$ together form a pyrrolidine, morpholine or piperazine ring which is optionally substituted by $C_1$- to $C_4$-alkyl, or $R^3$, $R^4$, $R^5$ and/or $R^6$, together with the ortho position of the phenyl ring, form a tetrahydroquinoline, indoline, julolidine, phenmorpholine, tetrahydroquinoxaline or carbazole ring which is optionally substituted by $C_1$- to $C_4$-alkyl, phenyl or benzyl, $R^7$ and $R^8$ each independently is hydrogen, $C_1$- to $C_4$-alkyl, $C_1$- to $C_4$-alkoxy, carboxyl or halogen, n denotes an integer between 1 and 4, E is a hetero-aromatic radical of the formula

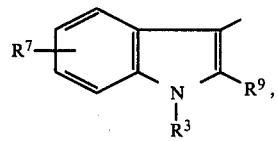

and $R^9$ is H, $C_1$- to $C_4$-alkyl, phenyl, carboxylic acid $C_1$- or $C_2$-alkyl ester, carboxylic acid amide which is optionally N-substituted by $C_1$- to $C_4$-alkyl, or $C_1$- to $C_4$-alkoxy or a radical of the formula

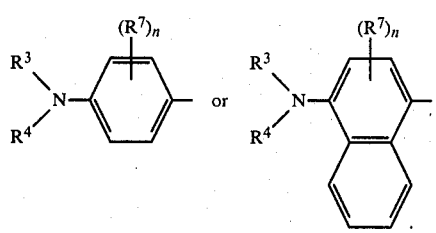

3. A process according to claim 1, in which
$R^3$ and $R^5$ each independently is hydrogen, methyl, ethyl, hydroxyethyl, propyl or butyl, $R^4$ and $R^6$ each independently is methyl, ethyl, sulphobenzyl or sulphoethyl, $R^7$ and $R^8$ each independently is hydrogen, methyl, methoxy or chlorine, E is

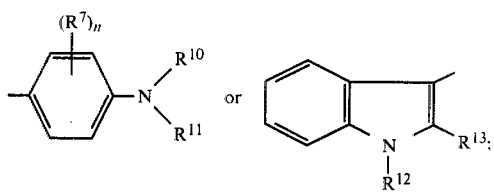

$R^{10}$ and $R^{11}$ each independently is methyl, ethyl or hydroxyethyl,
$R^7$ is hydrogen, methyl, carboxyl or chlorine,
$R^{12}$ is methyl, ethyl, hydroxyethyl, propyl or butyl, and
$R^{13}$ is H, methyl or phenyl,
the quinone comprises tetrachloro- or tetrabromobenzoquinone, and the catalyst comprises a catalytic amount of at least one of nitrogen monoxide and nitrogen dioxide.

* * * * *